United States Patent [19]
Ewald

[11] 3,923,396
[45] Dec. 2, 1975

[54] VARIABLE BASE RANGEFINDER

[75] Inventor: William P. Ewald, Webster, N.Y.

[73] Assignee: Eastman Kodak Company, Rochester, N.Y.

[22] Filed: July 26, 1974

[21] Appl. No.: 492,115

Related U.S. Application Data

[63] Continuation-in-part of Ser. No. 402,421, Oct. 1, 1973, abandoned.

[52] U.S. Cl. ................................... 356/17; 356/15
[51] Int. Cl.² ........................................ G01C 3/24
[58] Field of Search ................ 356/3, 8, 9, 15, 17

[56] References Cited
UNITED STATES PATENTS

| | | | |
|---|---|---|---|
| 2,186,615 | 1/1940 | Mihalyi | 356/8 |
| 2,210,191 | 8/1940 | Tronnier | 356/8 |

FOREIGN PATENTS OR APPLICATIONS

| | | | |
|---|---|---|---|
| 27,022 | 5/1908 | United Kingdom | 356/9 |
| 769,982 | 3/1957 | United Kingdom | 356/17 |

Primary Examiner—Alfred E. Smith
Assistant Examiner—F. L. Evans
Attorney, Agent, or Firm—R. F. Brothers

[57] ABSTRACT

A variable base rangefinder including a mechanism for varying the ranging base distance in which a ranging mirror and a beam splitter are mounted on a rotatable plate in a fixed relative orientation. In a preferred embodiment, the plate is rotatable about an axis that intersects the primary optical axis, the planes defined by the ranging mirror and beam splitter are non-parallel, and a negative lens is mounted between the rangefinder mirror and the scene and between the beam splitter and the scene.

8 Claims, 4 Drawing Figures

VARIABLE BASE RANGEFINDER

CROSS REFERENCE TO RELATED APPLICATIONS

This is a continuation-in-part of the earlier filed application Ser. No. 402,421; filed Oct. 1, 1973; in the name of William P. Ewald for VARIABLE BASE RANGEFINDER, now abandoned.

BACKGROUND OF THE INVENTION

1. Field of the Invention

This invention relates to rangefinders, and in particular, to coincidence rangefinders in which two images of a scene are superimposed with ranging information being determined by alignment of the two images.

2. Description of the Prior Art

Rangefinders which utilize superimposed images of a scene are well known in the art. In such rangefinders, a beam splitter is provided through which a first image of a scene is directed to a plane. A second image of the scene is reflected by a movable ranging mirror onto the beam splitter which reflects the second image of the scene into superposition with the first image. By adjustment of the ranging mirror, the two images are brought into coincidence with ranging information being determined by the position of the ranging mirror.

In many such rangefinders, the images of vertical scene lines are brought into coincidence for range determination. The relative orientation of the ranging mirror and beam splitter is varied during movement of the ranging mirror but the mirror position/range correlation must be repeatable since misorientation may result in erroneous range information. In particular, a misorientation which produces a coincidence or horizontal image alignment error may result in a wrong range indication. A misorientation which produces a halving or vertical image alignment error may make ranging more difficult and may, when a slant rather than a vertical line is used for ranging, result in a wrong range indication. Moreover, ranging is usually achieved by small displacements of the ranging mirror, with a typical mirror moving less than one degree in rotation over the entire focus range. Consequently, relatively complex structures are required to insure proper positioning of the ranging mirror with respect to the beam splitter and to provide the necessary sensitivity to ranging mirror displacement.

SUMMARY OF THE INVENTION

It is an object of the present invention to provide an improved rangefinder.

It is another object of the present invention to provide such an improved rangefinder which is simple and inexpensive to manufacture and assemble.

It is a further object of the present invention to provide such an improved rangefinder which, when incorporated in a camera, is simple to operate.

These and other objects of the present invention are achieved by a rangefinder that includes a beam splitter and a ranging mirror which are fixedly mounted on a rotatable plate. Ranging information is provided by rotation of the plate with the relative orientation of the ranging mirror with respect to the beam splitter remaining fixed. In a preferred embodiment, the plate is rotatable about an axis that intersects the primary optical axis, the planes of the ranging mirror and beam splitter are non-parallel, and negative lenses are mounted between both the ranging mirror and beam splitter and the scene.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Because photographic apparatus is well known, the present description will be directed in particular to elements forming part of, or cooperating more directly with, the present invention. Camera elements not specifically shown or described herein are understood to be selectable from those known in the art.

Figure 1:
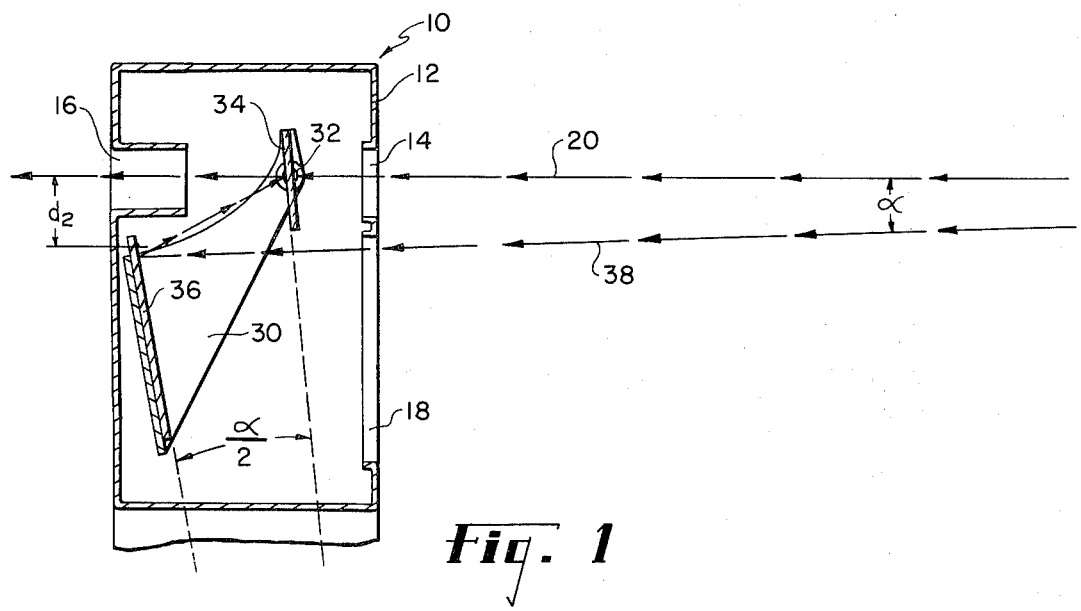
FIGS. 1 and 2 are schematic views of one embodiment of a rangefinder according to the present invention.
Figure 2:
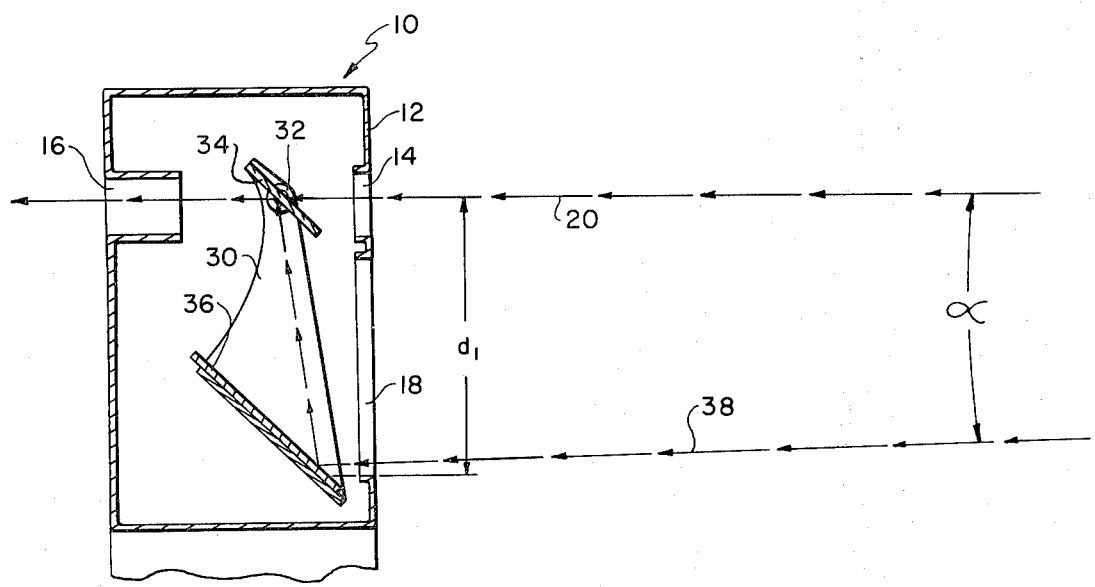

Referring now to FIGS. 1 and 2, a rangefinder 10 is illustrated which consists of a housing 12 that includes viewfinder windows 14 and 16 and a rangefinder window 18. For simplicity of illustration, no optical elements, such as the lenses which may be desirable for the functioning of the rangefinder, have been illustrated. It is clear that such elements may be provided in the rangefinder of the present invention to provide a magnified or minified image of the scene. Viewfinder windows 14 and 16 are optically aligned along a primary optical axis 20 that is directed toward the desired scene by the operator, who then views one image of the scene through viewfinder windows 14 and 16 along primary optical axis 20.

A plate 30 is rotatably mounted within housing 12 by means of a pin 32 fixed to housing 12. A beam splitter 34 and a ranging mirror 36 are fixedly mounted on plate 30, for movement with plate 30 about pin 32. In a preferred embodiment, pin 32 is fixed to housing 12 in a position so that the axis of pin 32 intersects primary optical axis 20 at the center of beam splitter 34. This preferred position of pin 32 is selected to minimize the size and required movement of beam splitter 34. However, other positions of pin 32 are also possible in which its axis does not intersect primary optical axis 20 or beam splitter 34. Moreover, beam splitter 34 and ranging mirror 36 are preferably not parallel but are mounted with a fixed, small angle between their respective planes. Because beam splitter 34 and ranging mirror 36 are not parallel, optical axis 38 will not be parallel to optical axis 20 but will intersect optical axis 20 at a constant angle which is equal to twice the angle between the respective planes of beam splitter 34 and ranging mirror 36. Thus, if the angle of orientation between the planes of beam splitter 34 and ranging mirror 36 is $\alpha/2$, then axis 38 will intersect primary optical axis 20 at a constant angle of $\alpha$. When optical axis 38 is directed toward the desired scene, a second image of the scene will be provided by ranging mirror 36 and beam splitter 34 along optical axis 38 through ranging window 18 and the second scene will be directed through viewfinder window 16 to the observer.

As is conventional in coincidence rangefinders, the two images furnished through viewfinder window 16 to the observer will be superimposed and should appear to be a single image when rangefinder 10 is properly adjusted. In order for rangefinder 10 to be adjusted, it is necessary only that plate 30 be rotated about pin 32. It may be seen by comparison of FIGS. 1 and 2 that such rotation changes the effective range base distance of rangefinder 10 and therefore changes the point at which optical axis 20 and optical axis 38 intersect but not the angle of intersection of the two axes. The intersection point, when the rangefinder mechansim is properly adjusted, will coincide with the desired scene. For operation of the present rangefinder, the operator will merely rotate plate 30 about pin 32 until the two images of the photographic scene are coincident in viewfinder window 16. Ranging information may then be determined by the relative rotational position of plate 30 about pin 32.

The rangefinder illustrated in FIGS. 1 and 2 will operate within a limited range that is determined, in part, by the necessity of providing a second image path along optical axis 38. Distances $d_1$ and $d_2$ indicate the usable limits within which scene light will pass through rangefinder window 18 and be reflexed by ranging mirror 36 and beam splitter 34 through viewfinder window 16. Distances $d_1$ and $d_2$ are determined by ranging mirror 36, rangefinder window 18 and angle $\alpha$. In one example, ranging mirror 36 has its effective near edge 0.3 inches from primary optical axis 20 in the near focus position (FIG. 1), its effective far edge 1.0 inches from primary optical axis 20 in the far focus position (FIG. 2) and a constant angle $\alpha/2$ of 7.5 minutes. The rangefinder thus has a maximum distance $d_1$ of 1 inch, an angle $\alpha$ of 15 minutes and will be characterized by a far focus distance or maximum usable range of about 20 feet. The range to objects at that distance or closer to the rangefinder may be determined. However, the double images of scenes at further distances cannot be brought into coincidence. In addition, the rangefinder also has a minimum usable range at which the double images may be brought into coincidence. That is, the configuration of the optical elements in the rangefinder must provide an unobstructed view of the scene along optical axis 38 when plate 30 is in the near focus position shown in FIG. 1. For the example given above, the rangefinder has a minimum distance of 0.3 inches; an angle $\alpha$ of 15 minutes between optical axis 38 and primary optical axis 20 and a near focus distance of about 6 feet.

Figure 3:
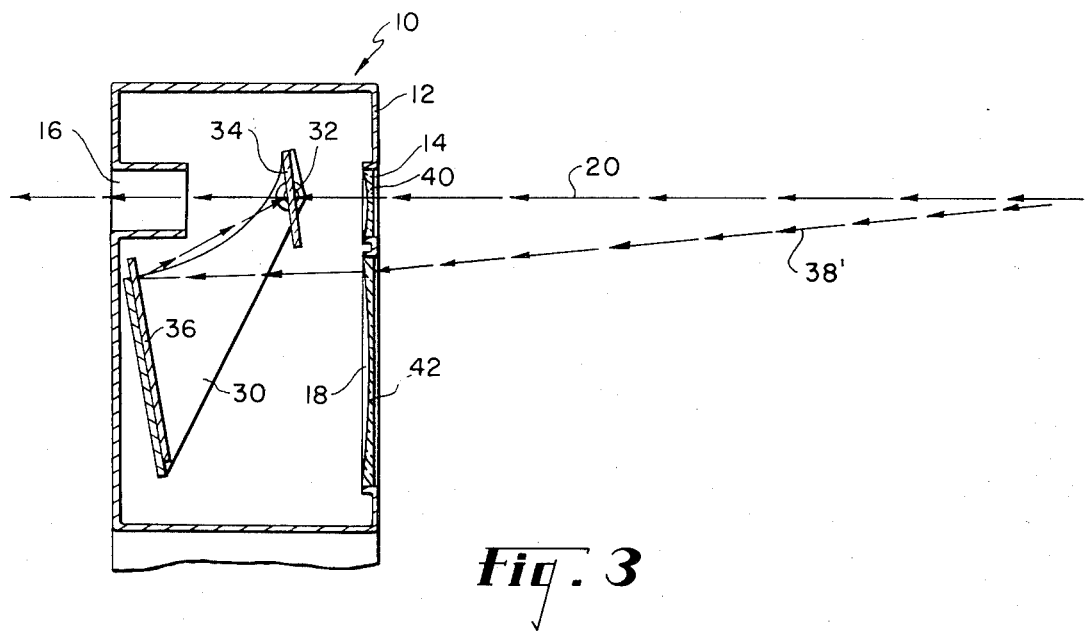
FIGS. 3 and 4 are schematic views of a preferred embodiment of a rangefinder according to the present invention.
Figure 4:
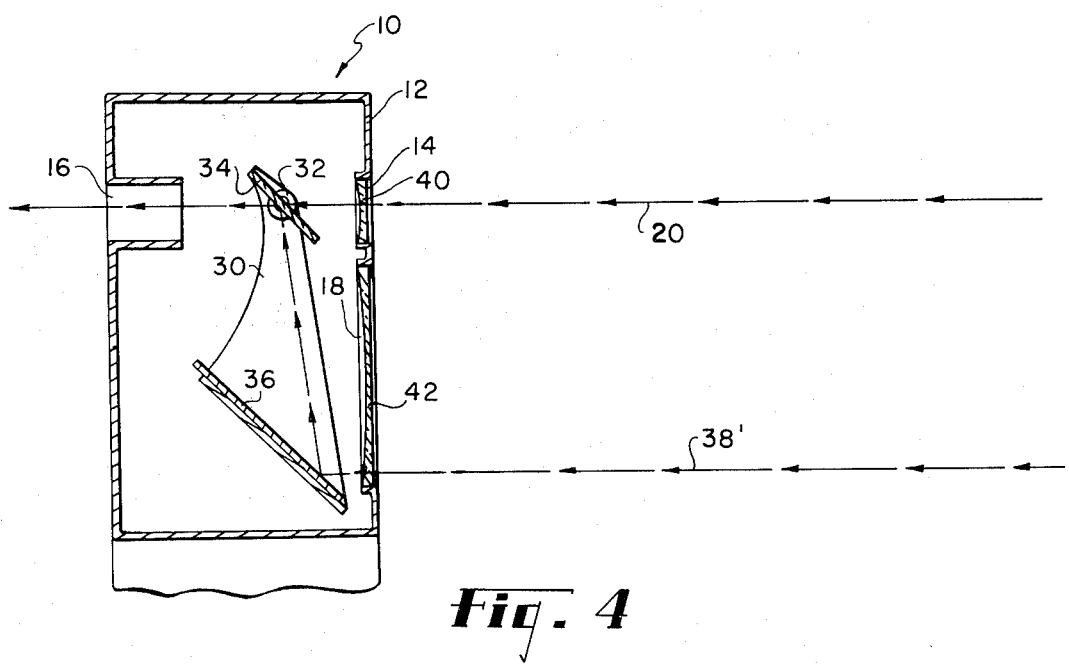

In a preferred embodiment of this invention, as is illustrated in FIGS. 3 and 4, a negative lens 40 is mounted within viewfinder window 14 and a negative lens 42 is mounted within rangefinder window 18. The effect of lens 42 is to extend the usable limits of the rangefinder because of its refractive power. Because lens 42 will also have an effect on image size, a negative lens 40, of equal power, is preferably mounted within viewfinder window 14. Lenses 40 and 42 need only be weak lenses with lenses of approximately three tenths diopter power being satisfactory in operation with the rangefinder described in the preceding paragraph to extend the usable limits of that rangefinder to three feet to infinity. When plate 30 is positioned as in FIG. 4, lens 42 will produce coincidence between the rays traveling along optical axis 20 and an optical axis 38 which is now parallel to optical axis 20. Thus, the preferred rangefinder may be adjusted to have coincident images for infinite subject distances. Lens 42 will also move the near focus distance closer to the rangefinder because of its refractive power with a further increase in the usable limits of the rangefinder.

The rangefinder of the present invention is relatively simple to construct and mount within a camera, since only one moving part, plate 30, is necessary. Movement of plate 30 in a vertical direction about pin 32, while not desirable, does not produce any noticeable halving error. Moreover, no coincidence or halving errors will develop during operation because beam splitter 34 and ranging mirror 36 are fixed in relationship to each other. The sensitivity of the rangefinder has also been improved since ranging mirror 36 is moved through an angle appreciably greater than the one degree available in typical coincidence rangefinders. Thus, a longer scale may be provided with finer divisions of the range information.

The rangefinder of the present invention may be either of the coupled or the uncoupled type. In an uncoupled type, a scale may be provided adjacent to plate 30 with the range information indicated by the position of plate 30 with respect to the scale. A coupled type requires the addition of coupling mechanisms which are known in the art to adjust the lens system of the camera to a focus adjustment consisting with the range information determined by the rotational position of plate 30.

The invention has been described in detail with particular reference to preferred embodiments thereof, but it will be understood that variations and modifications can be effected within the spirit and scope of the invention.

I claim:

1. A coincidence rangefinder comprising:

means, including a substantially planar beam splitter and substantially planar reflective means mounted in a fixed non-parallel relative orientation, for receiving and transmitting light rays from a scene along first and second axes to provide first and second images of the scene; and means, on which said beam splitter and reflective means are mounted, for moving said beam splitter and reflective means about a fixed axis and for bringing said first and second images into coincidence by movement of said beam splitter and reflective means about said fixed axis.

2. A rangefinder as in claim 1 comprising a first negative lens positioned between said beam splitter and the scene, and a second negative lens positioned between said reflective means and the scene.

3. A rangefinder as in claim 1 wherein said beam splitter and said reflective means define a first and second plane respectively and said moving and bringing means is positioned so that said fixed axis is perpendicular to said first axis, lies in said first plane and is parallel to said second plane.

4. A coincidence rangefinder comprising:

a substantially planar beam splitter positioned to receive and transmit light rays from a scene along a first axis to provide a first image of the scene;

a substantially planar reflective means, positioned in a fixed non-parallel relative orientation with respect to said beam splitter, for receiving and reflecting light rays from the scene to said beam splitter along a second axis to provide a second image of the scene; and means, mounting said beam splitter and said reflective means for movement about a fixed axis, for bringing said first and second images into coincidence by movement of said beam splitter and said reflective means about said fixed axis.

5. A rangefinder as in claim 4 comprising a first negative lens positioned between said beam splitter and the scene, and a second negative lens positioned between said reflective means and the scene.

6. A rangefinder as in claim 4 wherein said beam splitter and said reflective means define a first and second plane respectively and said bringing means is positioned so that said fixed axis is perpendicular to said first axis, lies in said first plane and is parallel to said second plane.

7. A rangefinder comprising:
a beam splitter that defines a first plane and is positioned to receive and transmit light rays from a scene along a first axis to provide a first image of the scene;
a first negative lens positioned along said first axis;
a mirror that defines a second plane and is positioned to receive and reflect light rays from the scene along a second axis to said beam splitter to provide a second image of the scene;
a second negative lens positioned along said second axis;
a plate on which said beam splitter and said mirror are fixedly mounted with said first and second planes being non-parallel; and
means, mounting said plate for movement about a fixed axis that is perpendicular to said first axis, lies in said first plane and is parallel to said second plane, for bringing said first and second images into coincidence by movement of said plate about said fixed axis.

8. A coincidence rangefinder comprising:
a beam splitter having a substantially planar surface which partially reflects and partially transmits light incident thereon;
a mirror having a substantially planar reflective surface;
means for fixedly mounting said beam splitter and said mirror so that said planar surface of said beam splitter is non-parallel with respect to said planar surface of said mirror, said beam splitter being positioned to receive and transmit light-rays from a scene along a first axis to provide a first image of the scene, and said mirror being positioned to receive and reflect light rays from the scene along a second axis to said beam splitter to provide a second image of the scene; and
means for rotating said mounting means about a fixed axis to bring said first and second images into coincidence.

* * * * *